(12) United States Patent
Hashima

(10) Patent No.: US 9,528,421 B2
(45) Date of Patent: Dec. 27, 2016

(54) EXHAUST DEVICE OF INTERNAL COMBUSTION ENGINE

(75) Inventor: Takashi Hashima, Gotenba (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 791 days.

(21) Appl. No.: 13/578,722

(22) PCT Filed: Mar. 19, 2010

(86) PCT No.: PCT/JP2010/002008
§ 371 (c)(1),
(2), (4) Date: Aug. 13, 2012

(87) PCT Pub. No.: WO2011/114388
PCT Pub. Date: Sep. 22, 2011

(65) Prior Publication Data
US 2012/0323463 A1 Dec. 20, 2012

(51) Int. Cl.
*F01N 3/10* (2006.01)
*F01N 11/00* (2006.01)
*F01N 3/025* (2006.01)
*F02B 37/00* (2006.01)
(Continued)

(52) U.S. Cl.
CPC .............. *F01N 11/002* (2013.01); *F01N 3/106* (2013.01); *F01N 3/0256* (2013.01); *F01N 2430/06* (2013.01); *F01N 2430/085* (2013.01); *F01N 2550/05* (2013.01); *F01N 2560/06* (2013.01); *F01N 2610/102* (2013.01); *F01N 2900/1404* (2013.01); *F02B 37/00* (2013.01); *F02D 41/1446* (2013.01); *F02P 19/026* (2013.01); *Y02T 10/47* (2013.01)

(58) Field of Classification Search
CPC ........ F01N 11/002; F01N 3/002; F01N 3/025; F01N 3/0253; F01N 3/0256; F01N 3/106; Y02T 10/47; F02D 41/1446
See application file for complete search history.

(56) References Cited

U.S. PATENT DOCUMENTS 4,567,725 A * 2/1986 Shinzawa et al. ............... 60/274
2004/0221571 A1* 11/2004 Lewis et al. .................... 60/277
(Continued)

FOREIGN PATENT DOCUMENTS

JP 59-134315 A 8/1984
JP 63-266113 A 11/1988
(Continued)

OTHER PUBLICATIONS

International Search Report of PCT/JP2010/002008 dated Jun. 22, 2010.

*Primary Examiner* — Audrey K Bradley
*Assistant Examiner* — Jason Sheppard
(74) *Attorney, Agent, or Firm* — Sughrue Mion, PLLC

(57) ABSTRACT

An exhaust device of an internal combustion engine includes a burner device (40) including a fuel addition device (15) for adding fuel to an exhaust passage (12) of the internal combustion engine (1), and igniting the added fuel, and a controller (50) which detects an abnormal condition of the burner device (40) on the basis of a temperature change at a temperature detection point in the exhaust passage (12) downstream of the fuel addition device (15) after changing the amount of addition of the fuel.

8 Claims, 5 Drawing Sheets

(51) Int. Cl.
*F02D 41/14* (2006.01)
*F02P 19/02* (2006.01)

(56) References Cited

U.S. PATENT DOCUMENTS

| | | | |
|---|---|---|---|
| 2005/0279156 A1* | 12/2005 | He | F01N 3/035 73/23.31 |
| 2007/0199312 A1 | 8/2007 | Kapparos et al. | |
| 2009/0000605 A1* | 1/2009 | Craig et al. | 123/549 |
| 2010/0319318 A1* | 12/2010 | Miyoshi | F01N 3/103 60/277 |

FOREIGN PATENT DOCUMENTS

| | | |
|---|---|---|
| JP | 11-229860 A | 8/1999 |
| JP | 2009-144512 A | 7/2009 |
| JP | 2009-528479 A | 8/2009 |

\* cited by examiner

EXHAUST DEVICE OF INTERNAL COMBUSTION ENGINE

CROSS REFERENCE TO RELATED APPLICATIONS

This application is a National Stage of International Application No. PCT/JP2010/002008 filed Mar. 19, 2010, the contents of all of which are incorporated herein by reference in their entirety.

TECHNICAL FIELD

This invention relates to an exhaust device capable of adding fuel to an exhaust passage of an internal combustion engine, and equipped with a function for detecting abnormal conditions.

BACKGROUND ART

A variety of methods are suggested for detecting the amount of PM (particulate matter) deposited in an exhaust passage in an internal combustion engine.

PTL 1 discloses a device which includes a plurality of particulate sensors mounted in an exhaust passage and respectively including heaters for burning off PM deposited on the plurality of particulate sensors. Time required for the regeneration is compared among the plurality of particulate sensors, thus allowing detection of abnormal conditions of the particulate sensor.

PTL 2 discloses a device in which the timing of performing the regeneration process is determined on the basis of an exhaust pressure in the upstream side of a filter in order to perform the regeneration treatment for heating the filter collecting the PM for burning, and the regeneration timing is not determined when the rate of a change in exhaust temperature with time is negative. In the device, avoiding the influence of a change in exhaust temperature makes it possible to avoid degradation of the accuracy in the measurement of the degree of clogging with PM on the basis of an exhaust pressure.

CITATION LIST

Patent Literature

PTL 1: Japanese Patent Laid-Open No. 2009-144512
PTL 2: Japanese Patent Laid-Open No. S63-266113 (1988)

SUMMARY OF INVENTION

Technical Problem

However, PTL 1 or 2 does not disclose means for, in an engine which includes a burner device equipped with a fuel addition device for adding fuel to an exhaust passage in the internal combustion engine for igniting the added fuel, detecting an abnormal condition of the burner device.

It is an object of the present invention to provide means for, in an engine including a burner device for adding fuel to an exhaust passage for ignition, detecting an abnormal condition in the burner device.

Solution to Problem

A first aspect of the present invention provides an exhaust device of an internal combustion engine which comprises a burner device comprising a fuel addition device for adding fuel to an exhaust passage of the internal combustion engine and igniting the added fuel, and a controller which detects an abnormal condition of the burner device on the basis of a temperature change at a temperature detection point in the exhaust passage downstream of the fuel addition device after changing the amount of addition of the fuel.

In the aspect, the burner device includes the fuel addition device and ignites the added fuel. The controller detects an abnormal condition of the burner device on the basis of a temperature change at a temperature detection point in the exhaust passage downstream of the fuel addition device after changing the amount of addition of the fuel. The abnormal condition of the burner device has an effect on the temperature change at the temperature detection point after the amount of fuel addition has been changed. In consequence, according to the present invention, the detection of an abnormal condition of the burner device is made possible. A change in the amount of addition described herein includes the case of increasing or decreasing the amount of addition while keeping on adding, as well as the start of addition and the end of addition.

Preferably, the temperature change includes the delay time from a time from which the amount of fuel addition is stepwise decreased until the temperature at the temperature detection point decreases stepwise. The stepwise decrease in the amount of fuel addition includes the end of the fuel addition.

A malfunction occurring in the burner device may possibly cause a delay in the temperature change, so that the malfunction of the burner device can be suitably detected according to this aspect. In this case, the controller may determine that the malfunction occurs when the delay time exceeds a predetermined reference delay time.

Preferably, the device further comprises a collision member for a collision of the added fuel. The collision member is placed upstream of the temperature detection point.

PM may be deposited on the surface of the collision member. The deposited PM temporarily absorbs the added fuel. After the amount of fuel addition has stepwisely decreased, the absorbed fuel evaporates and is released to be oxidized or burned, so that the time of stepwise decrease of the temperature at the temperature detection point is delayed as compared with the normal conditions in which PM is not deposited. As the amount of PM deposition is the larger, the delay time is the longer. Accordingly, the malfunction of the burner device caused by the PM deposition on the collision member is able to be suitably detected on the basis of the delay time.

Preferably, the controller further corrects the amount of fuel addition of the fuel addition device on the basis of the delay time, and then operates the fuel addition device to add the fuel of the corrected amount of fuel addition.

In the aspect, it is possible to continue the operation without repair/replacement parts or the regeneration process. In this case, the controller may be operated such that as the delay time is the longer, the amount of fuel addition is the larger.

Preferably, the burner device further comprises a heating device capable of igniting the fuel added to the exhaust pipe. The controller further changes the output of the heating device on the basis of the delay time.

In the aspect, it is possible to continue the operation without repair/replacement parts or the regeneration process.

In this case, the controller may be operated such that as the delay time is the longer, the output of the heating device is the larger.

Preferably, the device further comprises a removal device capable of performing a removal operation of removing the cause of the malfunction of the burner device. The controller further operates the fuel addition device to add the fuel of the corrected amount of fuel addition when the delay time is smaller than a predetermined removal reference value, and operates the removal device to perform the removal operation when the delay time is equal to or larger than the removal reference value.

In the aspect, it is possible to perform appropriate processing in accordance with the degree of the abnormal conditions of the burner device.

Preferably, the controller further produces a warning output when the delay time after the removal operation has been performed is larger than a predetermined warning reference value.

According to the aspect, it is possible to output a warning in an appropriate manner when the removal of the cause of the malfunction is insufficient even after the removal operation has been performed.

Preferably, when the peak temperature immediately before the temperature at the temperature detection point decreases stepwise is lower than a predetermined reference peak temperature, the controller determines that PM is deposited if the delay time is equal to or longer than a predetermined reference delay time, and that the fuel addition device fails if the delay time is shorter than the reference delay time.

According to the aspect, it is possible to identify a type of the malfunction cause.

It should be noted that the solutions to technical problems in the present invention can be used in combination as much as possible.

Advantageous Effects of Invention

According to the present invention, the detection of abnormal conditions of the burner device is achieved.

DESCRIPTION OF EMBODIMENTS

First Embodiment

Figure 1:
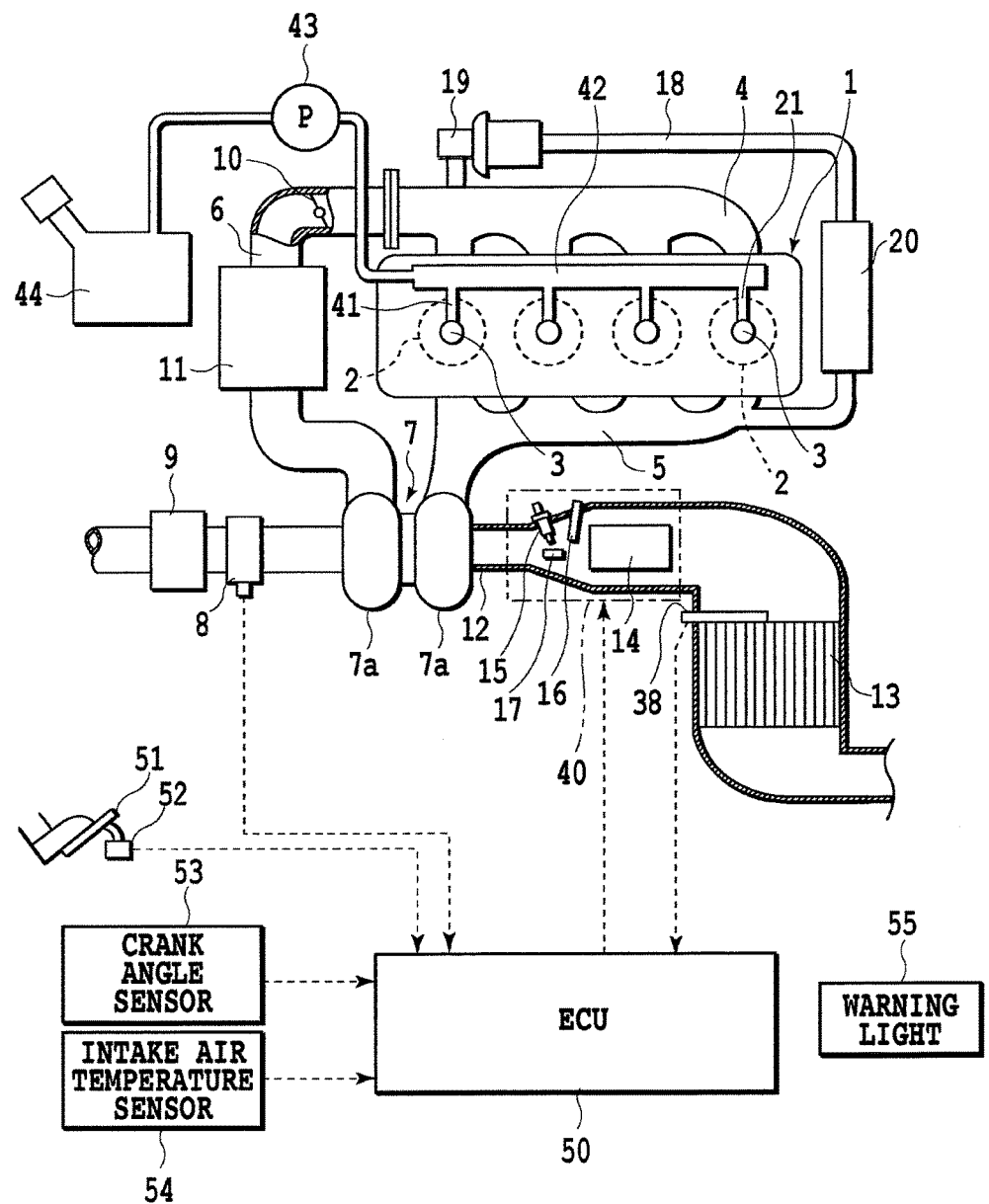
FIG. 1 is a schematic diagram of a first embodiment according to the invention.

Preferred embodiments of the present invention will be described below in detail. FIG. 1 illustrates a first embodiment of the present invention. In FIG. 1, an engine body 1 is a compression ignition internal combustion engine (diesel engine), but may be of other type of internal combustion engine. The engine body 1 has a combustion chamber 2 in each of four cylinders. An electronically controlled injector 3 for injecting fuel is placed in each combustion chamber 2.

To the combustion chamber 2 are connected an intake manifold 4 and an exhaust manifold 5. An intake manifold 4 is connected through an intake pipe 6 to an outlet of a compressor 7a of an exhaust turbocharger 7. An inlet of the compressor 7a is connected through an airflow meter 8 to an air cleaner 9. The upstream end of the air cleaner 9 is open to an atmosphere.

A throttle valve 10 driven by a step motor is placed in the intake pipe 6. An intercooler 11 is placed around the intake pipe 6 for cooling the intake air flowing in the intake pipe 6. Engine cooling water is guided into the intercooler 11, so that the intake air is cooled by the engine cooling water.

The exhaust manifold 5 is connected to an inlet of an exhaust turbine 7b of the exhaust turbocharger 7. An outlet of the exhaust turbine 7b is connected through an exhaust pipe 12 to a PM collection device 13. A compact oxidation catalyst 14 is placed in an engine exhaust passage upstream of the PM collection device 13, that is, in the exhaust pipe 12. The compact oxidation catalyst 14 has a smaller volume than that of the PM collection device 13, and a part of the exhaust gases flowing into the PM connection device 13 flows through the compact oxidation catalyst 14. A NOx catalyst and a silencer, which are not shown, are connected in series to the exhaust pipe 12 downstream of the PM collection device 13. The downstream end of the silencer is open to an atmosphere.

The PM collection device 13 and the compact oxidation catalyst 14 have an oxidation catalyst supported on a base material. The base material is of a honeycomb structure in the shape of an approximately circular cylinder made of porous ceramic. The honeycomb structure is formed of ceramic materials such as cordierite, silica, alumina or the like. The base material includes a plurality of gas passages defined by a plurality of partitions and each extending parallel to the flow direction of the exhaust gas. The base material for the PM collection device 13 is of a so-called wall flow type in which first passages having sealed upstream ends and second passages having sealed downstream ends are defined to be arranged in alternate positions. The exhaust gas flows from the second passages with the sealed downstream ends through the flow-path wall of the porous ceramic into the first passages with the sealed upstream ends, and then flows toward the downstream. At this stage, the PM in the exhaust gas is collected by the porous ceramics to be prevented from being emitted into the atmosphere. On the other hand, the base material for the compact oxidation catalyst 14 is of a so-called flow through type without the above-described sealed ends, in which the upstream ends and the downstream ends of the gas flow paths are open. For example, $Pt/CeO_2$, $Mn/CeO_2$, $Fe/CeO_2$, $Ni/CeO_2$, $Cu/CeO_2$, or the like can be employed as oxidation catalyst.

An injector 15 for adding fuel to the compact oxidation catalyst 14 is placed in the exhaust pipe 12 upstream of the compact oxidation catalyst 14, in which the injection tip is exposed to the interior of the exhaust pipe 12. The fuel in a fuel tank 44 is added to the injector 15 through a fuel pump 43. For the purpose of accelerating the combustion process, a pipe line for adding combustion air to the interior of the exhaust pipe 12 from outside, a control valve, and a compressor may be provided.

A glow plug 16 is mounted in the exhaust pipe 12 downstream of the injector 15. The glow plug 16 is located to cause the fuel added from the injector 15 to come into contact with the leading end of the glow plug 16 serving as a heat generating portion. A direct-current power source and a booster circuit (none of them is shown) for supplying power to the glow plug 16 are connected to the glow plug 16. Instead of the glow plug, a ceramic heater may be employed as means for ignition.

Figure 5:
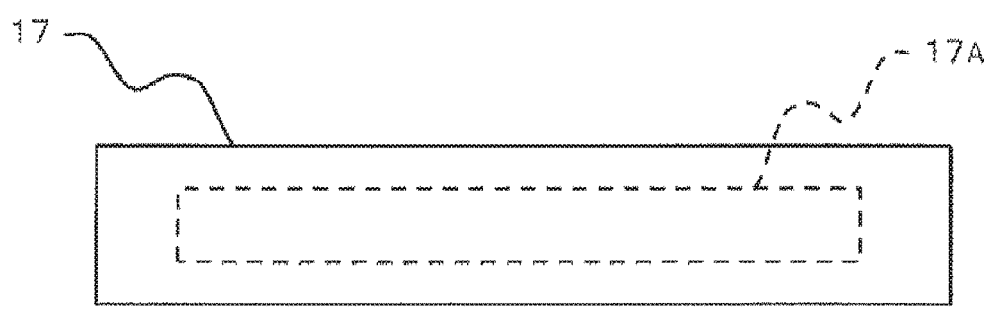
FIG. 5 is a schematic diagram of a collision plate according to an exemplary embodiment.

In order to accelerate fuel atomization, a collision plate 17 is placed in the exhaust pipe 12 to allow the fuel sprayed from the injector 15 to collide with the collision plate 17. The collision plate 17 is of a flat plate shape, but other various shapes and structures, such as a curved plate shape, a punched plate, a mesh and the like, may be employed and a plurality of collision plates or collision members may be mounted. As shown in FIG. 5, the collision plate 17 incorporates therein an electro-thermal heater 17A such as a ceramic heater or the like. The compact oxidation catalyst 14, injector 15, the glow plug 16 and the collision plate 17 form a burner device 40. The burner device 40 is controlled by an ECU 50, which will be described later.

Upon addition of fuel from the injector 15 and energization of the glow plug 16, a rich mixture of the added fuel and the exhaust gas existing in the exhaust pipe 12 is ignited by the glow plug 16 or at least oxidized. The ignited or oxidized mixture passes through the compact oxidation catalyst 14 in which the mixture is further burned or oxidized. In this manner, the heated gas at high temperature is discharged from the compact oxidation catalyst 14, and then is mixed with the exhaust gas which has flown through the passage between the compact oxidation catalyst 14 and the exhaust pipe 12, the result of which is added to the PM collection device 13. The burner device 40 is capable of maintaining and accelerating the warming-up state and the active state of the PM collection device 13, which accordingly is advantageous to an improvement in cold emission immediately after a cold start of the engine body 1.

Only a part of the gas in the exhaust pipe 12 passes through the compact oxidation catalyst 14, and the velocity of flow of the gas within the compact oxidation catalyst 14 is slower than that of the gas outside thereof. Accordingly, a sufficient time period of reaction within the compact oxidation catalyst 14 can be ensured, which is advantageous to a rise in temperature of the heated gas. When the temperature of the compact oxidation catalyst 14 is sufficiently high, the glow plug 16 may be stopped, and the mixture may be burned directly in the compact oxidation catalyst 14. On the other hand, when the temperature of the compact oxidation catalyst 14 is not sufficiently high, such as immediately after a cold start of the engine, it is desirable to activate the glow plug 16. Since the fuel injected from the injector 15 collides with and splashes from the collision member 17, it is possible to effectively guide the fuel to the glow plug 16 and the compact oxidation catalyst 14.

The exhaust manifold 5 and the intake manifold 4 are interconnected through an EGR passage 18. An electronically controlled EGR control valve 19 is placed in the EGR passage 18. An EGR cooler 20 is placed around the EGR passage 18 for cooling an EGR gas flowing in the EGR passage 18. The engine cooling water is guided into the EGR cooler 20, so that the EGR gas is cooled by the engine cooling water.

A temperature sensor 38 is mounted in the intake pipe 12 and near the front end face of the PM collection device 13. The temperature sensor 38 is placed adjacent to the downstream end of the burner device 40, and detects a temperature of a central portion of the front end face of the PM collection device 13. The temperature sensor 38 has a thermistor of which resistance varies with temperature, and can detect a change of the exhaust temperature as a change in resistance of the thermistor.

Each of the injectors 3 is connected to a common rail 42 through a fuel supply pipe 41. The common rail 42 is connected to a fuel tank 44 via an electronically controlled, variable flow-rate fuel pump 43. The fuel reserved in the fuel tank 44 is supplied into the common rail 42 by the fuel pump 43. The fuel supplied into the common rail 42 is supplied to the injectors 3 through the respective fuel supply pipes 41.

An electronic control unit (ECU) 50, which is a controller, comprises a well-known digital computer, and is equipped with a ROM (Read Only Memory), a RAM (Random Access Memory), a CPU (microprocessor), a nonvolatile memory, an input port and an output port, which are interconnected via a bidirectional bus.

An output signal of the temperature sensor 38 is input to an input port of the ECU 50 via a corresponding AD converter. An accelerator pedal 51 is connected to a load sensor 52 generating an output voltage proportional to a depressing amount of the accelerator pedal 51. The output voltage of the load sensor 52 is input to an input port via a corresponding AD converter. Further, an input port is connected to a crank angle sensor 53 that generates an output pulse for, for example, every 15-degree turn of the crankshaft of the engine body 1. Further, an input port is connected to an intake air temperature sensor 54 placed near the throttle valve 10.

On the other hand, output ports of the ECU 50 are connected to step motors for driving the throttle valve 10 and the EGR control valve 19 via each corresponding drive circuit. Output ports are also connected to the injectors 3 and 15, the fuel pump 43 and a warning light 55 installed in the cabin. The operations of these actuators are controlled by the ECU 50. The ROM of the ECU 50 stores therein a variety of programs, reference values and initial values. Such reference values and initial values include a reference temperature-rise rate RTs, reference delay times DTs1 and DTs2, and a reference peak temperature PTs, which are used in malfunction detection process described later.

The ECU 50 controls the injection of the injectors 3 and 15. In the injection control, the ECU 50 calculates an instruction amount of fuel injection on the basis of parameters representing the vehicle conditions, particularly, the operation conditions of the engine body 1, including detection values of the airflow meter 8, the load sensor 52 and the crank angle sensor 53. Then, the ECU 50 outputs a control signal to open the injectors 3 and 15 for a time period corresponding to the instruction amount. The amount of fuel according to the instruction amount of fuel injection is supplied from the injectors 3 and 15 in response to the control signal.

Also, the ECU 50 controls the burner device 40 for addition and ignition of the fuel to selectively increase the temperature of the compact oxidation catalyst 14. A part or all of the fuel added from the injector 15 is ignited by the glow plug 16, thereby increasing the temperature of the exhaust gas. As necessary, the ECU 50 adds the fuel to the PM collection device 13 by injecting a larger amount of fuel than the required amount of the compact oxidation catalyst 14. As a result, it is possible to perform the burning and oxidation of the deposited particulate matter (PM) (regeneration operation), and NOx reduction process and SOx poisoning recovery process of the NOx catalyst.

Figure 2:
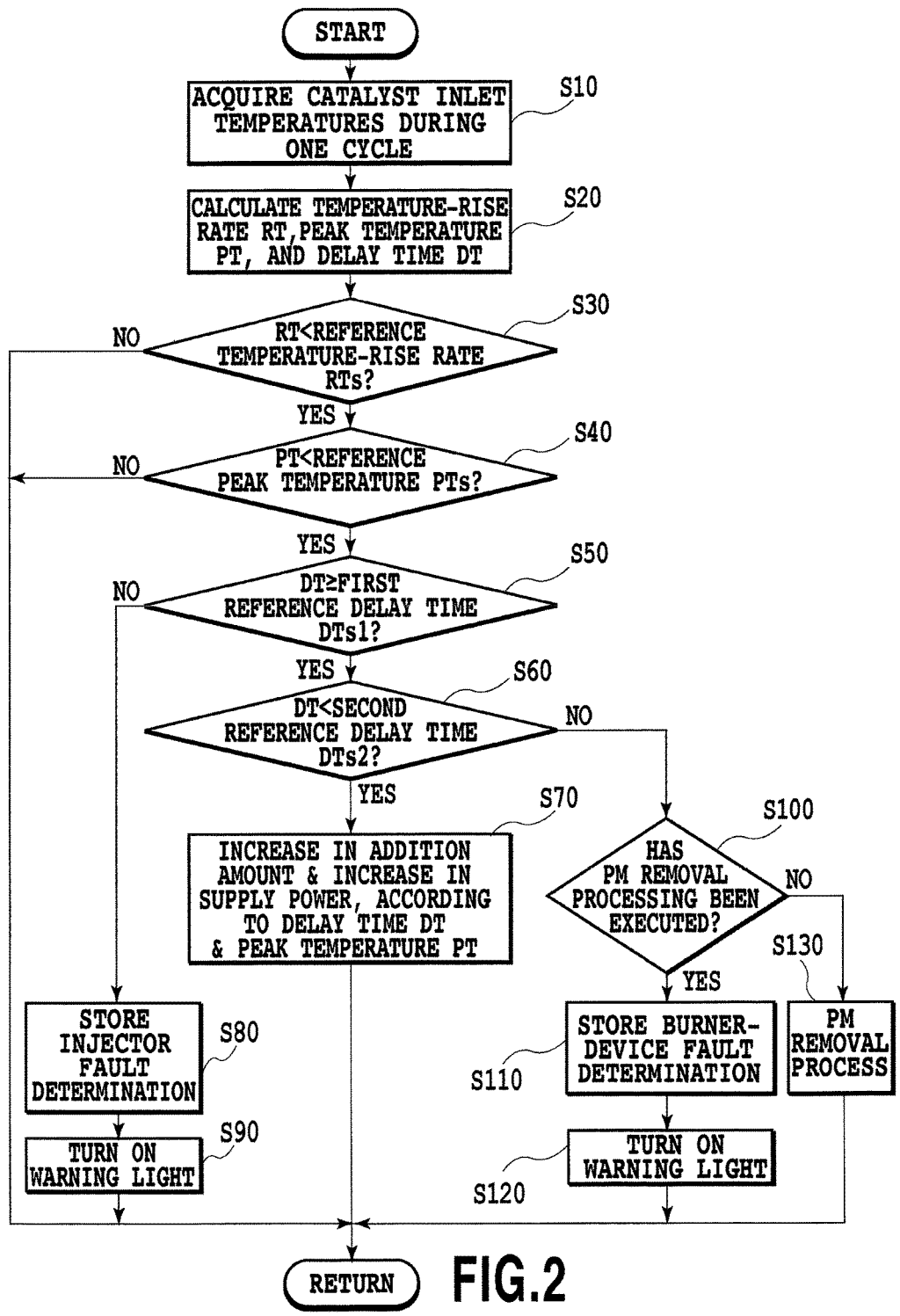
FIG. 2 is a flowchart showing malfunction detection process.

Further, the ECU 50 performs the following malfunction detection process in parallel with each of the aforementioned controls. The malfunction detection process will be described with reference to FIG. 2. The process routine in FIG. 2 is executed repeatedly on the condition that the not-shown ignition switch is turned on and the engine body 1 is in operation. In FIG. 2, the ECU 50 initially reads catalyst inlet temperatures during one cycle from the start of injection from the injector 15 by execution of the aforementioned injection control until the start of injection in the subsequent cycle after the completion of the preceding injection, based on the detection values of the temperature sensor 38 (S10).

Next, the ECU 50 calculates, from the read catalyst inlet temperatures during one cycle, a temperature-rise rate RT, a peak temperature PT and a delay time DT (S20).

Those parameters will be described with reference to FIG. 3. The temperature-rise rate RT means a rate of rise in the catalyst inlet temperature from, for example, injection start time t1 (the time at which the ECU 50 instructs the injector 15 to inject the fuel) or a rising point (t2) detected after that, to reference time t3 preset to a time point before reaching the peak temperature (for example, one second later). The rising point is, for example, a time when a rate of increase within, for example, a predetermined micro-time interval exceeds a predetermined value. The peak temperature PT means a maximum value of the catalyst inlet temperatures in one cycle. The delay time DT means a time period from injection end time t4 (the time at which the fuel injection command from the ECU 50 to the injector 15 is terminated) to a time (t6) from which the catalyst inlet temperature decreases stepwisely. The "time from which the catalyst inlet temperature decreases stepwise" can be detected as a time when a rate in increase of the catalyst inlet temperature in, for example, a predetermined micro-time interval falls below a predetermined negative value. The end time of the delay time DT may be detected vicariously by use of a time (t6) at which the catalyst inlet temperature reaches a maximum value (i.e. the peak temperature PT).

Figure 3:
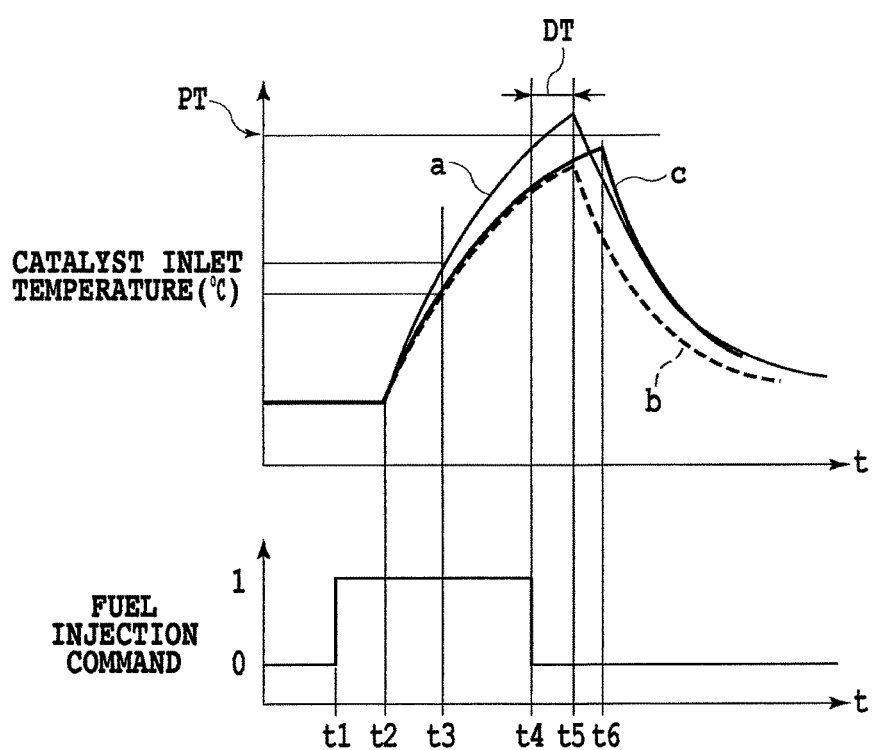
FIG. 3 is a graph showing the transition of temperatures at a catalyst inlet.

Among the examples of the catalyst inlet temperatures shown in FIG. 3, a thin solid line a shows normal conditions, a broken line b shows the case in which a fault occurs in the injector 15, and a heavy solid line c shows the case of large PM deposition. The length from the injection start time t1 to the injection end time t4 is approximately more or less 4 seconds.

Next, the ECU 50 determines whether the temperature-rise rate RT is lower than a predetermined reference temperature-rise rate RTs (S30), and whether the peak temperature PT is lower than a reference peak temperature PTs. If No in step S30 or S40, the process returns because it is conceivable that the burner device 40 may normally operate.

If Yes in steps S30 and S40, that is, if the temperature-rise rate RT is lower than the reference temperature-rise rate RTs and the peak temperature PT is lower than the reference peak temperature PTs, it is conceivable that some kind of malfunction occurs in the burner device 40. Because of this, the ECU 50 determines whether or not the delay time DT is equal to or longer than a predetermined first reference delay time DTs1 (S50).

If No in step S50, that is, if the delay time DT is shorter than the first reference delay time DTs1, it is conceivable that some kind of malfunction occurs in the injector 15 because of a low temperature-rise rate PT, a low peak temperature PT and short delays in the times (t5 and t6) of reaching the peak temperature. Such abnormal conditions of the injector 15 include clogging of the injection orifice and a delay in operation of the valve element. Therefore, the ECU 50 determines that a fault occurs in the injector and stores it in a predetermined diagnosis area of the nonvolatile memory of the ECU 50 (S80), and turns on the warning light in the cabinet (S90).

If Yes in step S50, that is, if the delay time DT is equal to or longer than the first reference delay time DTs1, a conceivable possibility is that PM is excessively deposited in any place of the burner device 40 because of a low temperature-rise rate PT, a low peak temperature PT and a delay in the time of reaching the peak temperature. Then, the ECU 50 determines whether the delay time DT is shorter than a second reference delay time DTs2 (S60). The second reference delay time DTs2 is longer than the first reference delay time DTs1.

Figure 4:
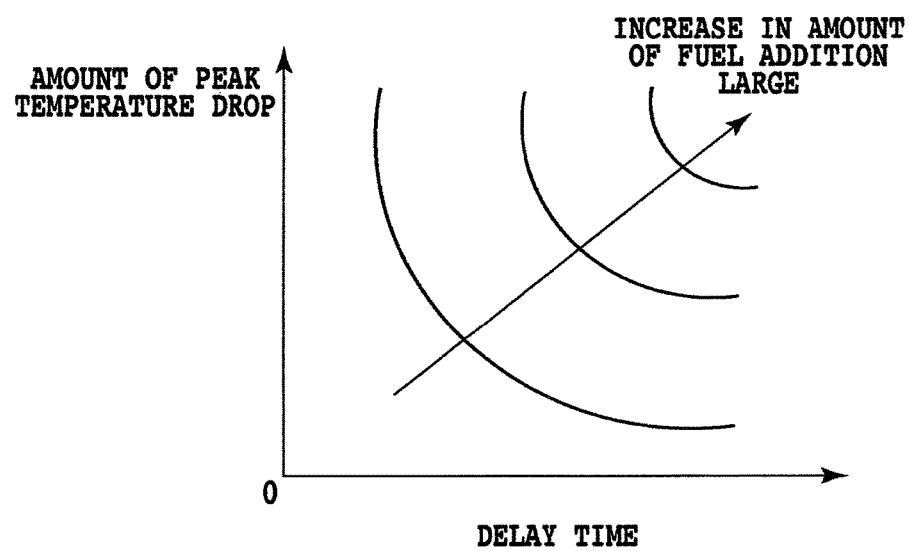
FIG. 4 is a graph showing an example of setting an increment of the amount of fuel to be added.

If Yes in step S60, that is, if the delay time DT is shorter than the second reference delay time DTs2, it is conceivable that the amount of PM deposition is not as large as to require urgent removal process. Because of this, the ECU 50 increases the amount of fuel added from the injector 15 and the power supplied to the glow plug 16 (S70). Increases in the amount of fuel addition and the supply power can be preferably set dynamically on the basis of the delay time DT and/or the peak temperature PT. For example, the larger amount of each increase can be determined, as the delay time DT is the longer or as the amount of decrease in the peak temperature PT is the greater (that is, the larger difference when a current peak temperature PT1 is subtracted from a peak temperature under normal conditions). FIG. 4 shows an example of determination of an increase in the amount of fuel addition, and similar characteristics apply to the amount of the increase in the supplied electrical power. The ECU 50 can refer to such a map pre-stored in the ROM to dynamically set an increase in the amount of fuel addition and/or the supplied electrical power. However, the increase in the amount of fuel addition and the supplied electrical power may be a fixed value.

If No in step S60, that is, if the delay time DT is longer than the second reference delay time DTs2, it is conceivable that the amount of PM deposition is as large as to require the urgent removal process. Because of this, the ECU 50 determines whether the PM removal process of applying electrical power to the heater of the collision plate 17 has been already executed within a past predetermined travel time period (S100).

If No in step S100, that is, if the PM removal process of applying electrical power to the heater of the collision plate 17 is not executed within the latest predetermined travel time period, the ECU 50 executes the PM removal process of applying electrical power to the heater of the collision plate 17 (S130).

If Yes in step S100, that is, if the PM removal process of applying electrical power to the heater of the collision plate 17 has been executed within the latest predetermined travel time period, it is conceivable that the reason that the delay is not corrected in spite of execution of the PM removal process is a malfunction other than the PM deposition. Therefore, the ECU 50 determines that a fault occurs in the burner device, and stores it in the predetermined diagnosis area of the nonvolatile memory of the ECU 50 (S110), then turns on the warning light in the cabinet (S120), and then returns the process.

As a result of the aforementioned process, depending on the levels of the temperature-rise rate RT and the delay time DT, any of the determination of the injector fault (S80), an increase in the amount of injection and an increase in the supply power (S70), the PM removal process on the collision plate 17 (S130), and the determination of the burner device fault (S110) is performed. The information stored in the diagnosis area can be read out by a predetermined diagnosis operation of a maintenance worker.

As thus described, in the present embodiment, an abnormal condition of the burner device 40 is detected based on a change in temperature at a temperature detection point in the exhaust passage downstream of the injector 15 after the amount of fuel addition has been changed (t1 and t4). Since the abnormal condition of the burner device 40 has an effect on a change in temperature at the temperature detection point after the amount of fuel addition has been changed, the detection of the abnormal condition of the burner device 40 is made possible according to the present embodiment.

In the present embodiment, the aforementioned temperature change includes the delay time DT from the time (t4) from which the amount of fuel addition is stepwisely decreased until the temperature at the temperature detection point stepwisely decreases stepwise (t6) (S50). A malfunction occurring in the burner device 40 may possibly cause a delay in the temperature change, so that a malfunction of the burner device 40 can be suitably detected according to this aspect. The ECU 50 determines that a malfunction occurs when the delay time DT exceeds the predetermined reference delay time DTs (S50). This makes it possible to achieve desired advantageous effects with a simple structure.

In the present embodiment, the device further comprises the collision plate 17 for a collision of the added fuel. The collision plate 17 is placed upstream of the temperature detection point. PM may be deposited on the surface of the collision plate 17. The deposited PM temporarily absorbs the added fuel. After the amount of fuel addition has stepwisely decreased (t4), the absorbed fuel evaporates and is released to be oxidized or burned, so that the time of stepwise decrease of the temperature at the temperature detection point (t6) is delayed. The larger the amount of PM deposition, the longer the delay time DT. Accordingly, a malfunction of the burner device 40 caused by the PM deposition on the collision plate 17 is able to be suitably detected on the basis of the delay time DT.

In the present embodiment, the ECU 50 further corrects the amount of fuel addition of the injector 15 on the basis of the delay time DT, and then operates the injector 15 to add the fuel of the corrected amount of fuel addition (S70). For this reason, it is possible to continue the operation without repair/replacement parts or the regeneration process.

In the present embodiment, the burner device 40 further comprises the glow plug 16 capable of igniting the fuel added to the exhaust pipe 12. The ECU 50 further changes the output of the glow plug 16 on the basis of the delay time DT. Thus, it is possible to continue the operation without repair/replacement parts or the regeneration process.

In the present embodiment, the device further comprises the heater capable of performing the removal operation of removing the cause of a malfunction of the burner device 40. The ECU 50 further operates the injector 15 to add the fuel of the corrected amount of fuel addition when the delay time DT is smaller than the predetermined removal reference value (reference delay time DTs2), and operates the heater to perform the removal operation for the burner device 40 when the delay time DT is equal to or larger than the removal reference value. As a result, it is possible to perform appropriate process in accordance with the degree of the abnormal conditions of the burner device.

In the present embodiment, the ECU 50 further produces a warning output when the delay time DT after the removal operation (S130) has been performed is larger than a predetermined warning reference value (reference delay time DTs2) (S110 and S120). Accordingly, it is possible to output a warning in an appropriate manner when the removal of the cause of the malfunction is insufficient even after the removal operation has been performed.

In the present embodiment, when the peak temperature PT immediately before the catalyst inlet temperature stepwisely decreases is lower than the predetermined reference peak temperature PTs (S40), the ECU 50 determines that PM is deposited if the delay time DT is equal to or longer than the first reference delay time DTs1, and that the injector 15 fails if the delay time DT is shorter than the first reference delay time DTs1 (S50). Accordingly, it is possible to identify a type of the malfunction cause.

The present invention has been described in some concrete manner, but it should be understood that various modifications and alternations of the invention will become apparent without departing from the spirit and scope of the invention, which is defined by the accompanying claims. The solutions to technical problems in the present invention can be used in combination as much as possible. A change in the amount of addition described in the present invention includes the case of increasing or decreasing the amount of addition while keeping on adding, in addition to the start of addition (t1, S30) and the end of addition (t4, S50). Such increase or decrease in the amount of addition becomes feasible by use of, for example, a variable-nozzle injector capable of varying the amount of fuel discharge per time.

In the present embodiment, all of the reference temperature-rise rate RTs, the reference delay time DTs1 and DTs2, and the reference peak temperature PTs are defined as predetermined fixed values, but one or more of them may be dynamically set on the basis of vehicle conditions (for example, a load and/or engine water temperature).

The injector 15 placed in the exhaust passage is employed as the fuel addition device in the present embodiment, but the fuel addition device in the present invention may be the injector 3 mounted in the combustion chamber 2 of the engine body 1. In this case, the fuel can be added to the exhaust passage by making an air-fuel ratio excessively rich or a so-called after-injection (fuel injection during the exhaust stroke entailing no explosion in the cylinder).

In the present embodiment, the heater incorporated in the collision plate 17 is used as the removal device. However, the fuel may be injected to be ignited in synchronization with the exhaust stroke by so-called after-injection (fuel injection during the exhaust stroke entailing no explosion in the cylinder) by the injector 3 mounted in the engine body 1, or by a dedicated injector (not shown) mounted in the exhaust manifold 5 (for example, one of the branches positioned immediately behind the exhaust port). The removal device in the present invention also includes such a structure.

The collision member may be omitted, and the present invention can achieve desired advantageous effects so long as the structure allows the fuel supplied to the exhaust passage to cause PM to be deposited on any member located in the exhaust passage with which the fuel collides. Further, the present invention can be applied to an engine without a turbocharger.

REFERENCE SIGNS LIST

3, 15 Injector
4 Intake manifold
5 Exhaust manifold
6 Intake pipe
7 Turbocharger
12 Exhaust pipe
13 Exhaust purification catalyst 14 Compact oxidation catalyst
16 Glow plug
17 Collision plate
40 Burner device
50 ECU

The invention claimed is:

1. An exhaust device of an internal combustion engine comprising:
   a burner device comprising a fuel addition device configured to add fuel to an exhaust passage of the internal combustion engine and ignite the added fuel; and
   a controller which is configured to control said burner device,
   wherein said controller is further configured to:
   (i) control said fuel addition device to stepwisely decrease an amount of addition of fuel;
   (ii) obtain a delay time, from a time at which an amount of addition of fuel is stepwisely decreased, to a time at which a temperature at a temperature detection point in the exhaust passage downstream of the fuel addition device stepwisely decreases; and
   (iii) determine that the burner device is abnormal if the delay time is equal to or longer than a predetermined reference delay time.

2. The exhaust device of the internal combustion engine according to claim 1, further comprising:
   a collision member with which the added fuel collides, the collision member being placed upstream of the temperature detection point.

3. The exhaust device of the internal combustion engine according to claim 1, wherein
   the controller is further configured to correct an amount of fuel addition of the fuel addition device on the basis of the delay time, and to operate the fuel addition device to add fuel of the corrected amount of fuel addition.

4. The exhaust device of the internal combustion engine according to claim 1, wherein
   the burner device further comprises a heating device configured to ignite the fuel added to the exhaust pipe, and
   the controller is further configured to change output of the heating device on the basis of the delay time.

5. The exhaust device of the internal combustion engine according to claim 1, wherein
   the controller is further configured, when a peak temperature immediately before a temperature at the temperature detection point stepwisely decreases is lower than a predetermined reference peak temperature, to determine that PM is deposited if the delay time is equal to or longer than a predetermined reference delay time, and to determine that the fuel addition device fails if the delay time is shorter than the reference delay time.

6. The exhaust device of the internal combustion engine according to claim 1, further comprising:
   a removal device configured to perform a removal operation of removing a malfunction cause of the burner device, wherein
   the controller is further configured to operate the fuel addition device to add fuel of a corrected amount of fuel addition intended to adjust the delay time when the delay time is smaller than a predetermined removal reference value, and to operate the removal device to perform the removal operation when the delay time is equal to or larger than the removal reference value.

7. The exhaust device of the internal combustion engine according to claim 6, wherein
   the controller is further configured to produce a warning output when the delay time after the removal operation has been performed is larger than a predetermined warning reference value.

8. The exhaust device of the internal combustion engine according to claim 6, wherein said removal device is an electro-thermal heater.

* * * * *